(12) United States Patent
Rosenfeldt et al.

(10) Patent No.: US 8,591,241 B2
(45) Date of Patent: *Nov. 26, 2013

(54) ELECTRICALLY HEATABLE MEDIA LINE AND LINE CONNECTOR

(75) Inventors: Sascha Rosenfeldt, Dortmund (DE); Martin Lechner, Lindlar (DE); Josef Brandt, Wipperfürth (DE); Harald Hagen, Wipperfürth (DE); Ulrich Hiltemann, Wermelskirchen (DE); Günter Sieper, Remscheid (DE); Markus Berger, Wipperfürth (DE)

(73) Assignee: VOSS Automotive GmbH, Wipperfürth (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/380,290

(22) PCT Filed: Jun. 24, 2010

(86) PCT No.: PCT/EP2010/059033
§ 371 (c)(1),
(2), (4) Date: Dec. 22, 2011

(87) PCT Pub. No.: WO2010/149757
PCT Pub. Date: Dec. 29, 2010

(65) Prior Publication Data
US 2012/0100735 A1    Apr. 26, 2012

(30) Foreign Application Priority Data

Jun. 23, 2009  (DE) .................... 20 2009 008 703 U
Jun. 24, 2009  (DE) .................... 20 2009 008 763 U
Sep. 10, 2009  (DE) .................... 20 2009 012 230 U (51) Int. Cl.
*F16L 53/00*    (2006.01)

(52) U.S. Cl.
USPC .............................. 439/193; 285/41; 392/468

(58) Field of Classification Search
USPC ...................... 439/193, 192; 285/41; 392/468
See application file for complete search history.

(56) References Cited

U.S. PATENT DOCUMENTS

| 6,328,583 B2 * | 12/2001 | Ness et al. ................... 439/193 |
| 2010/0144181 A1 * | 6/2010 | Karlsen et al. ............... 439/193 |
| 2010/0144182 A1 * | 6/2010 | Dude et al. ................... 439/193 |
| 2010/0253067 A1 | 10/2010 | Isenburg |
| 2010/0263740 A1 | 10/2010 | Borgmeier et al. |
| 2010/0290764 A1 | 11/2010 | Borgmeier et al. |

FOREIGN PATENT DOCUMENTS

| DE | 20 2007 009 588 | 9/2008 |
| DE | 20 2007 018 086 | 5/2009 |

OTHER PUBLICATIONS

International Search Report of PCT/EP2010/059033, Mailed on Oct. 29, 2010, 4 pages.

* cited by examiner

*Primary Examiner* — Gary Paumen
(74) *Attorney, Agent, or Firm* — Brinks Gilson & Lione (57) ABSTRACT

The present invention relates to an electrically heatable media line comprising a fluid line and at least one line connector, which comprises a fluid connector connected to a line end of the fluid line and an outer housing. The fluid line and the line connector each have electrical heating means, wherein the fluid connector is enclosed at least in the region of the heating means and together with an end section of the fluid line by the housing. The housing has fixing means for accommodating, in a mechanically fixing manner, the fluid connector with the connected line end and electrical conductors and conductor connectors of the heating means.

24 Claims, 8 Drawing Sheets

ELECTRICALLY HEATABLE MEDIA LINE AND LINE CONNECTOR

BACKGROUND

1. Field of the Invention

The present invention relates to an electrically heatable media line having a fluid line and at least one fluid connector, which is composed of a fluid connector connected to a line end of the fluid line and an outer housing. The fluid line and the fluid connector each include electrical heating means, wherein the fluid connector is enclosed at least in the region of the heating means and together with an end section of the fluid line in a capsule-like manner by the housing.

Furthermore, the invention also relates to a line connector, in particular for such a media line of the kind mentioned above, having at least one connecting section for the connection to a fluid line and to a transition section adjacent to the connecting section having an inner fluid channel, as well as to electrical heating means, and a housing enclosing the fluid connector in a capsule-like manner at least in the region of the heating means.

2. Description of the Related Technology

Such media lines and line connectors can especially be used in motor vehicles for media which, owing to their freezing point, already tend to freeze at relatively high ambient temperatures that frequently occur in winter. As a result of this, certain functions can be affected. This is the case with the lines for the windscreen wiper system, for example, but in particular with the lines for an aqueous urea solution, which is used as a $NO_x$ reduction additive for diesel engines with so-called SCR catalysts. The electrical heating means can therefore be activated in order to prevent freezing or in order to thaw the already frozen medium.

With regard to the prior art, reference is made, for example, to the publications DE 20 2007 009 588 U1, DE 20 2007 018 089 U1 and DE 20 2007 018 086 U1.

When assembling such media lines by connecting them with at least one line connector, the problem is often that, when closing the usually two-part housing of the line connector, the required electric conductors and conductor connectors of the heating means can get between the housing parts in a disturbing manner because—cf. DE 20 2007 009 588 U1—they are merely placed loosely in the cavity of the housing. It is therefore provided, e.g. according to DE 20 2007 018 089 U1, that the electrical connectors be enclosed by a plastic molding compound, in particular by extrusion coating or potting. This, however, results in additional manufacturing costs.

In view of the above limitations and drawbacks, the present invention provides an improved media line and a line connector of the kind described above in such a manner that good performance characteristics are achieved by means of a simple assembly and manufacture.

SUMMARY OF THE INVENTION

It is thus provided according to the present invention that the housing has fixing means for accommodating, in a mechanically fixing manner, the fluid connector with the connected line end as well as the electrical conductors and conductor connectors of the heating means. All inner components are mechanically fixed by means of these fixing means in such a manner that the assembly is simple and quick to carry out, and parts, such as, in particular, electrical conductor sections, cannot get between the housing parts when the housing is closed. Expensive potting or extrusion molding is no longer necessary. As the plastic molding compound is omitted, the housing advantageously encloses a certain air volume, and an improved effectiveness of the electrical heating means is achieved in this way.

BRIEF DESCRIPTION OF THE DRAWINGS

The invention shall be exemplified in more detail on the basis of the attached drawings, which show.

DETAILED DESCRIPTION

In the following description, the same parts are always designated with the same reference numerals in the different figures.

The electrically heatable media line 1 manufactured according to the present invention comprises a fluid line 2, which is connected at least at one end to a line connector 4. For most applications, the fluid line 2 is usually connected to a line connector 4 on both ends. Each line connector 4 discussed herein can optionally be an angle connector (FIGS. 1 to 7) or a straight connector (shown by way of example in FIG. 12).

The line connector 4 according to the present invention comprises an inner fluid connector 6 and an outer housing 8. The fluid connector 6 has at least one connecting section 10 (see in particular FIG. 2) for a media-impermeable connection to an end of the fluid line 2. The connecting section 10 has a transition section 12 connected to it which preferentially merges into a second connecting section 14, that preferably is configured as a plug connection of a fluid plug-in system. In the shown examples, the plug connection is configured as a socket for accommodating a fluid plug which is not shown. Alternatively, the second connecting section 14 can, however, also be configured as a plug. In addition, the fluid connector 6 can also either be connected directly to any assembly on the side of the second connecting section 14, or be configured, similarly to the first connecting section 10, for the connection to another fluid line. An inner fluid channel connecting the connecting sections 10, 14 runs through the fluid connector 6.

Figure 1:
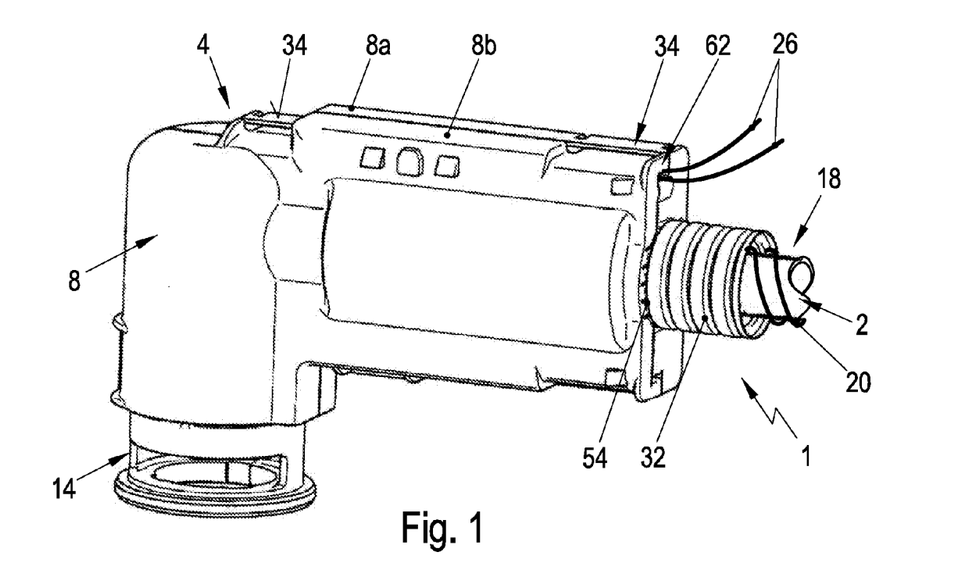
FIG. 1 is an enlarged perspective view of the end section of a media line with a line connector according to the present invention in a preferred embodiment.
Figure 2:
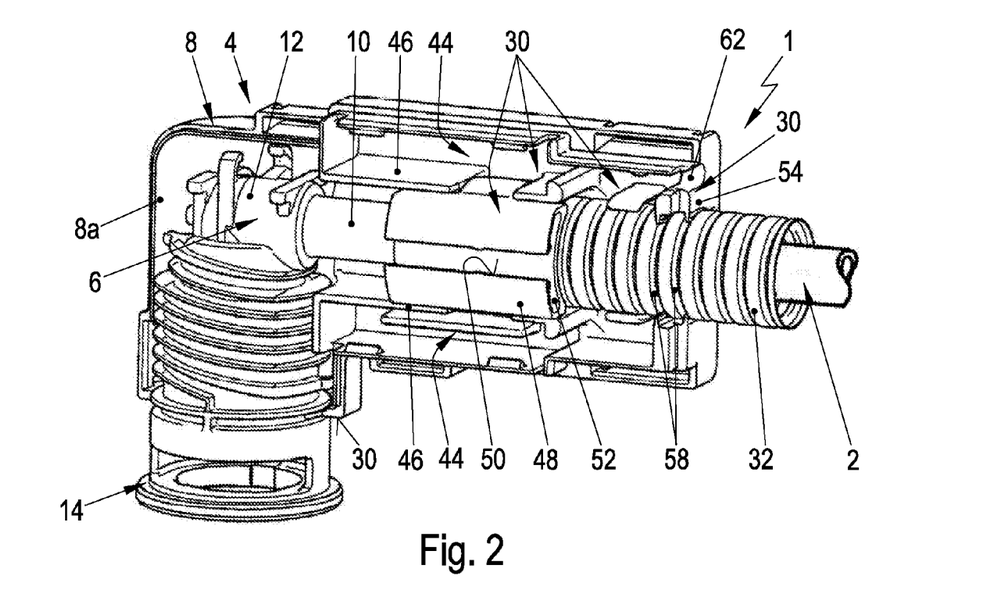
FIG. 2 is a perspective view, as in FIG. 1, but with an open housing of the line connector and without showing the heating means and their components.
Figure 3:
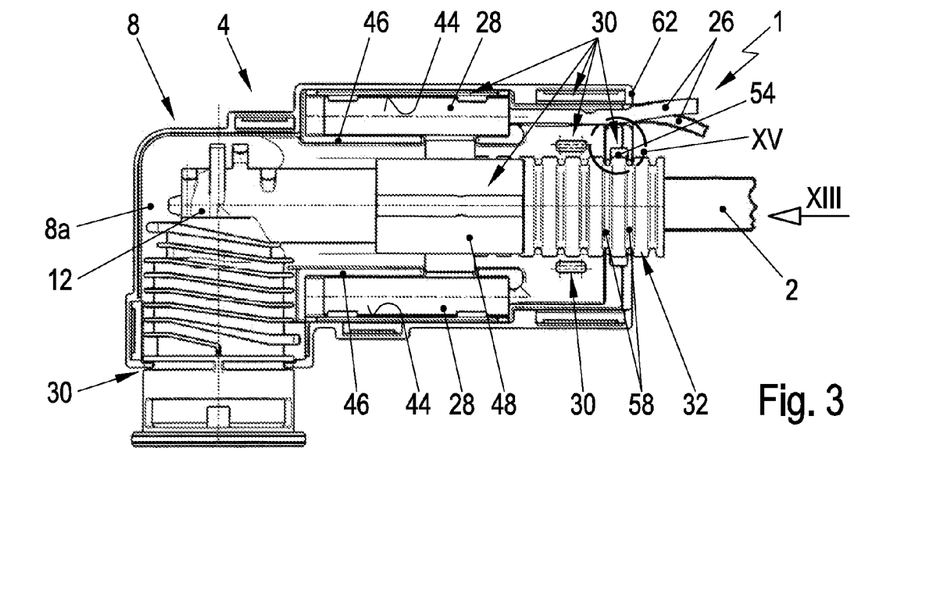
FIG. 3 is a side view relative to FIG. 2, additionally showing outer electrical connecting conductors and conductor connectors.
Figure 4:
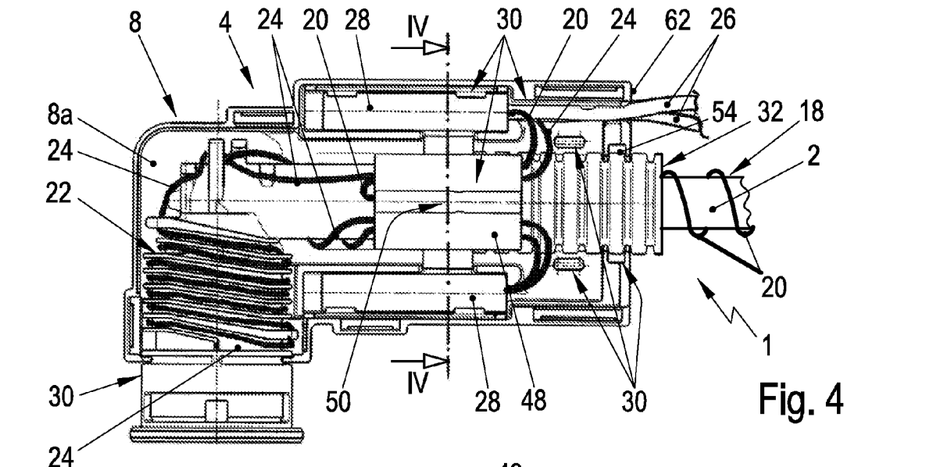
FIG. 4 is a view as in FIG. 3 with an exemplary illustration of the heating means with their components.
Figure 4A:
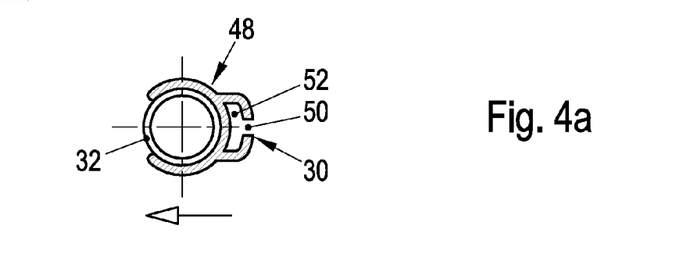
FIG. 4a is a cross-section of the line area taken generally along line IV-IV in FIG. 4 without the fluid line.

As seen in FIG. 4, the fluid line 2 is provided with electrical heating means 18, in particular in the form of at least one preferably helical heating conductor 20 extending over the periphery of the fluid line 2. The heating conductor or heating conductors 20 can be fixed to the fluid line 2 by means of a fixing position element 21 (only implied in FIGS. 18 and 19) tightly enclosing the fluid line 2 including the heating conductor 20, for example by means of at least one adhesive tape helically wrapped around the fluid line 2, or in another adequate manner.

Furthermore, the line connector 4 or, as the case may be, the inner fluid connector 6 is also provided with electrical heating means 22 (see FIG. 4), which preferably are likewise formed by at least one heating conductor 24 extending over the outer surface of the fluid connector 6. The heating conductor 24 conveniently also comprises a coiled feeder conductor and a likewise coiled, or short-distance run, return conductor.

As is further apparent from FIG. 4, the ends of the heating conductors 20, 24 are connected to one another, or, as the case may be, connected (interconnected) to outer connecting conductors 26, between the fluid line 2 and the fluid connector 6 via electric conductor connectors 28.

In this case, the fluid connector 6 is enclosed by the housing 8 at least in the region of its heating means 22 and together with the end of the fluid line 2 in a capsule-like manner.

According to the present invention, the housing 8 has fixing means 30 for exclusively mechanically fixing the fluid connector 6 with the connected end of the fluid line 2 as well as the conductor connectors 28 with the assigned heating conductors 20, 24 and the connecting conductors 26.

The fluid line 2 is enclosed together with its heating means 18 by a tubular or hose-like sheath 32. According to the present invention the fixing means 30 of the housing 8 also accommodates an end section of the sheath 32 in a fixing manner. In a preferred embodiment, the sheath 32 is formed by a corrugated tube (parallel corrugated protective tube, in particular made of plastic).

Figure 5:
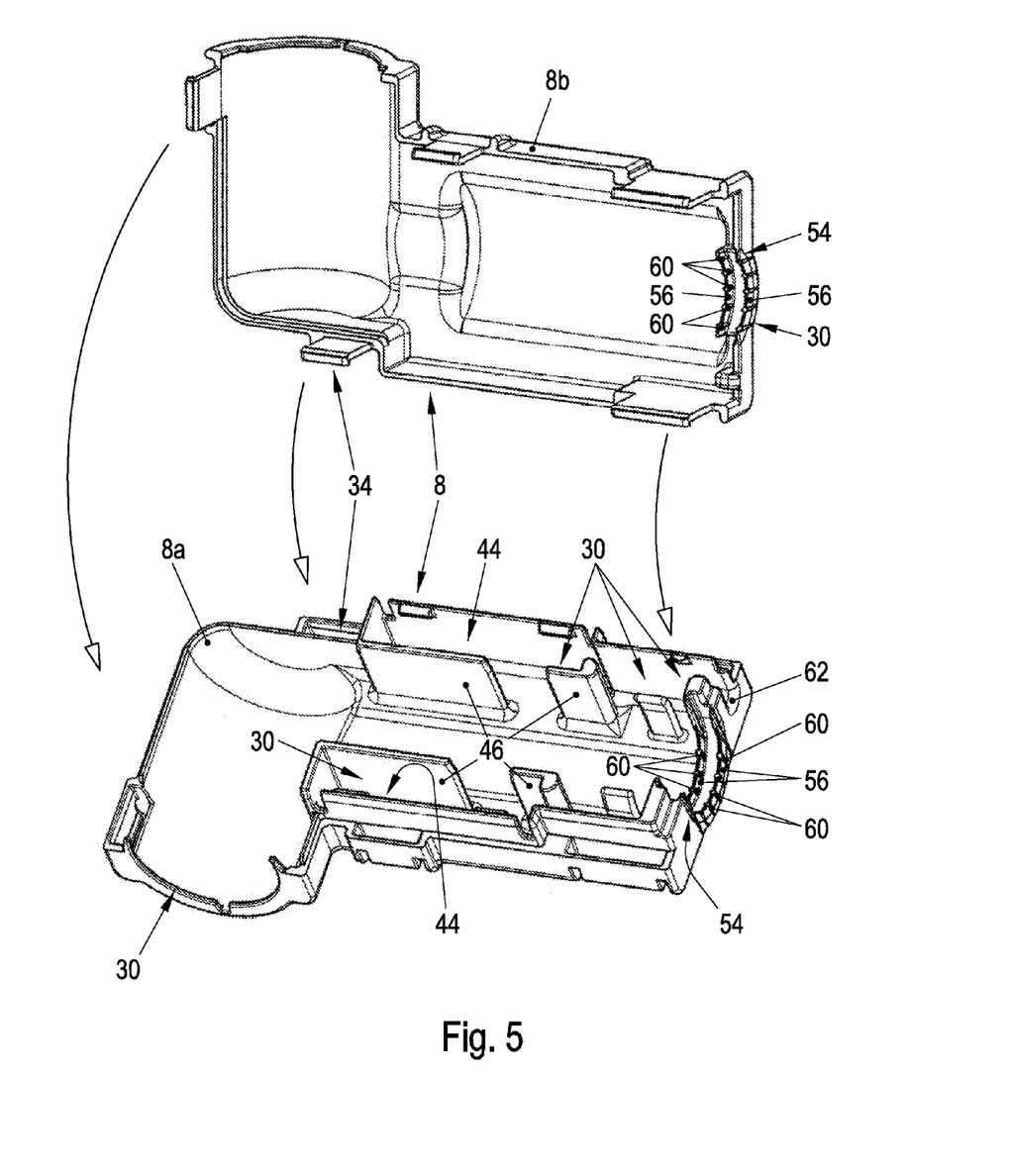
FIG. 5 is a perspective illustration of the two parts of the housing of the line connector according to the present invention in the open state in order to explain the closing process.
Figure 8:
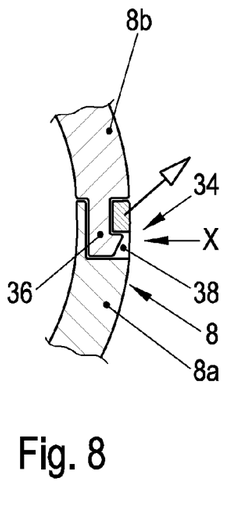
FIG. 8 is an enlarged cross section of a part of the housing of the line connector in the region of a first embodiment of a snap-on connection.
Figure 9:
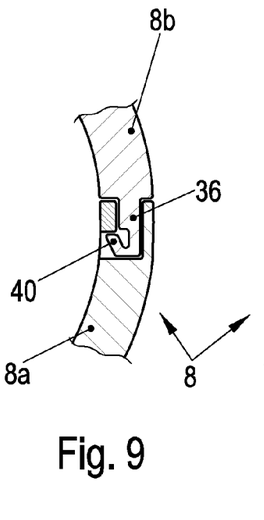
FIG. 9 is a cross section similar to FIG. 8 in a second embodiment of the snap-on connection.
Figure 10:
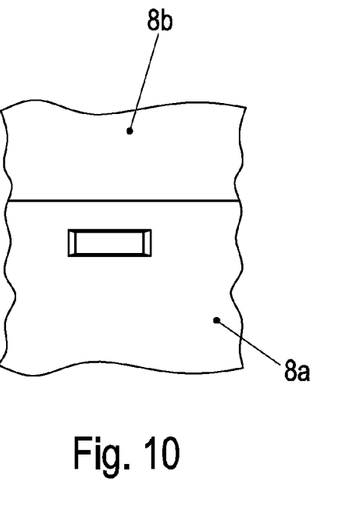
FIG. 10 is a partial side view of the region of the snap-on connection in the direction of arrow X according to FIG. 8.

As is in particular apparent from FIG. 5, the housing 8 comprises (at least) two half shell-like housing parts 8a and 8b, such that, in an open state, all components can be inserted into the first housing part 8a configured as the bottom part, so that all inner components are already fixed in the housing 8 via the fixing means 30 before the housing 8 is closed by superimposing the second housing part 8b configured as the top part. In the subsequent closed state, the housing parts 8a and 8b are then preferably non-detachably connected to one another, i.e. they cannot be separated without causing damage or by using a special tool. Unauthorized opening is thus prevented. In the preferred embodiments according to FIGS. 1 to 10, the housing parts 8a, 8b are connected via form-fitting snap-on connections 34 that cannot be detached without causing damage. These snap-on connections 34 each consist of a snap-on element which engages form-fittingly behind a snap-on edge with an indentation angle of ≥90° when closed. In this regard, reference is made in particular to FIGS. 8 to 10. According to FIG. 8 a snap-on projection 36 of one of the housing parts (e.g. 8b) engages form-fittingly in a snap-on recess 38 of the other housing part (e.g. 8a). In this case, the snap-on recess 38 is designed in such a manner that the material has to deform elastically in the direction of the arrow when snapped on. Detaching it subsequently without causing damage is therefore not possible. In case of the alternative according to FIG. 9, the snap-on projection 36 has a flexible tongue 40 which can no longer be accessed from the outside when the housing 8 is closed because it points to the interior of the housing.

Figure 12:
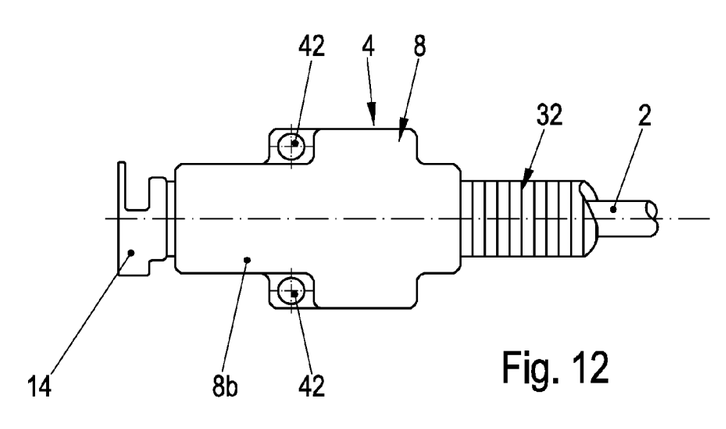
FIG. 12 is a side view similar to FIG. 6 of an alternative embodiment of the line connector and its housing.

FIG. 12 alternatively shows that the parts of the housing 8 are connected via non-detachable, at least not without a special tool, screws 42.

With regard to the fixing means 30, the housing 8 has at least one accommodating compartment 44, preferentially, however, two accommodating compartments 44 arranged bilaterally parallel next to the line connection area for fixing the electrical conductor connectors 28. In this regard, reference is made in particular to FIGS. 2 and 5. The accommodating compartments 44, which are preferentially diametrically opposed on both sides with regard to the connected fluid line 2 and to the connecting section 10, are inwardly limited by partitions 46 that can be dimensioned in such a manner that they also fix the connecting section 10 with the fluid line 2 or, as the case may be, its sheath 32 between them in a force-fitting manner. The electrical conductor connectors 28 are, for example, each formed by a longitudinal, metal connecting element, each connecting element being enclosed by an electrically insulating sheath and inserted jointly with the sheath into the respective accommodating compartment 44 of the housing 8 in a force-fitting or, as the case may be, form-fitting manner for fixing, and as a strain relief for the conductors. An additional strain relief for the conductors can optionally be achieved by wrapping the sheath 32 of the fluid line 2 or by laying it in a meander-shaped pattern. The conductor connectors 28 are each preferably configured as crimp connectors. Alternatively or additionally, they can, however, also be solder connectors or welded connectors. A first connector can, for example, be connected by crimping, and at least one second connector can be welded on. Each conductor connector 28 can also be formed by so-called peak connections by directly twisting the wire ends with an insulating sheath, in particular with a heat shrinkable tube. Several (at least two) conductor connectors 28 can be accommodated in the/each accommodating compartment 44.

Each conductor connector 28 is preferably provided with a sheath made of a heat shrinkable tube for electrical insulation. It can also especially be a heat shrinkable tube with an inner adhesive, which is thermally shrunk onto the connector and then positively bonds with the electrical connector element or, as the case may be, with the conductors. The heat shrinkable tube sheath fixed via the fixing means 30 in the housing 8 can thus absorb tensile forces for strain relief.

In another advantageous embodiment, a separate fixing part 48 is inserted into the housing 8 as a fixing means 30 for the electric conductors (in particular the heating conductors 20, 24) running inside the housing 8. This fixing section 48 is preferably laterally snapped on as a clip onto the sheath 32 of the fluid line 2, the fixing part 48 having an accommodating compartment 52 with an approximately C-shaped cross-section and a slit-like conductor insertion opening 50 for the conductors 20, 24 to be fixed. In this regard, reference is made in particular to the cross sectional view seen in FIG. 4a. The fixing part 48 is arranged inside the housing 8 in such a manner that the conductor insertion opening 50 is closed by the superimposed top part 8b after closing the housing 8.

Figure 13:
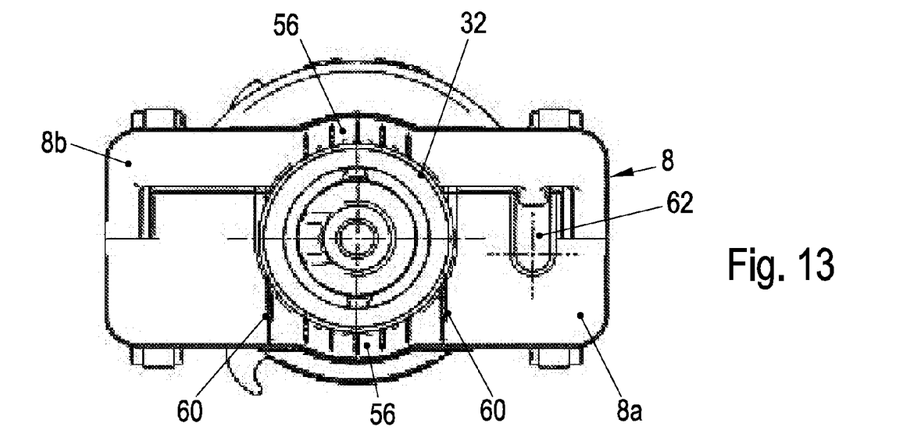
FIG. 13 is an enlarged view in the direction of arrow XIII in FIG. 3, but in the closed state of the housing in a 90° rotated position.
Figure 14:
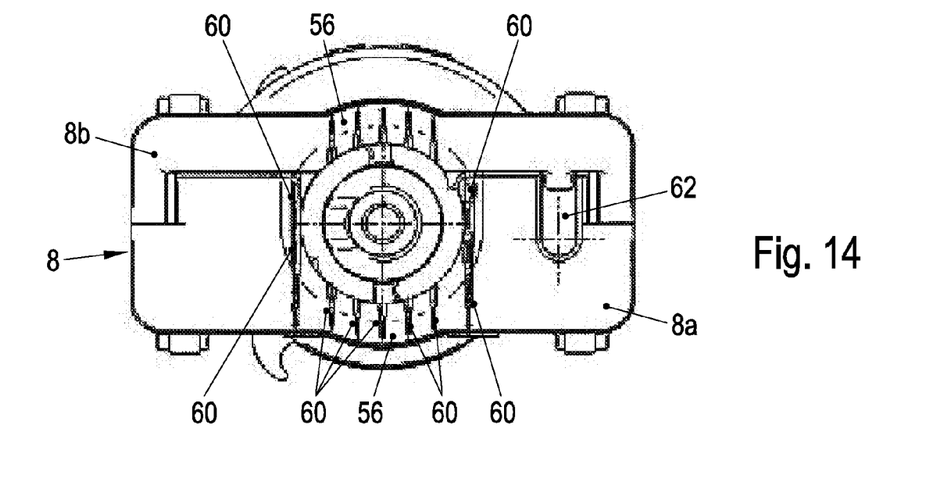
FIG. 14 is an illustration similar to FIG. 13, but without a conductor sheath.
Figure 15:
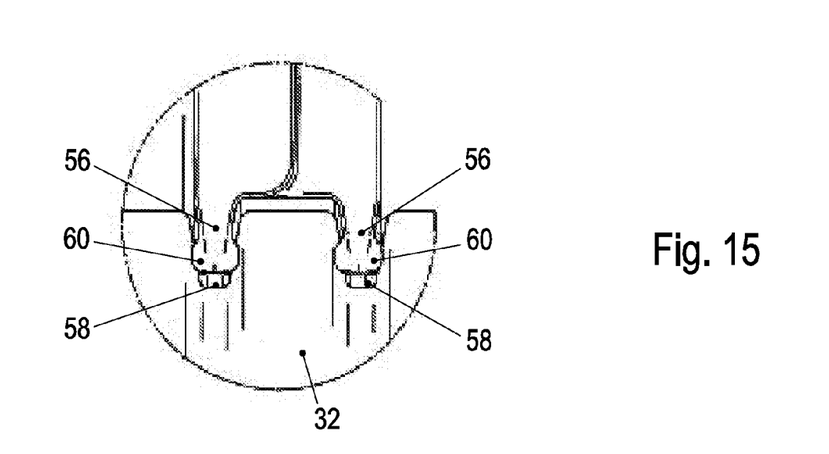
FIG. 15 is an enlarged cross-section of the area XV in FIG. 3.

The housing 8 further has an accommodating section 54 as a fixing means 30 for the sheath 32 of the fluid line 2 that is configured in such a manner that the sheath 32 is secured against movements in the longitudinal direction as well as against rotation around its longitudinal axis. In the preferred embodiment of the sheath 32 as a corrugated tube, the accommodating section 54 has an engaging contour with inner peripheral ribs 56 which engage radially in peripheral grooves 58 of the corrugated tube sheath 32. In this case, the peripheral ribs 56 according to FIG. 5 have tooth-like projections 60 which act force-fittingly or, as the case may be, form-fittingly against groove flanks of the grooves 58 of the corrugated tube sheath 32. As is apparent in particular from FIGS. 13 to 15, the projections 60 basically extend vertically to the partition plane of the housing parts 8a, 8b; two outer projections 60 of the bottom housing part 8a respectively extending tangentially through one of the grooves 58 of the corrugated tube sheath (s. FIGS. 13 and 14 as well as FIG. 15). In one particular, special embodiment, textile sheaths can also be fixed by means of the projections 60.

In the first embodiment according to FIGS. 1 to 5, the housing 8 has at least one through-opening 62 for the connecting conductor(s) 26. The connecting conductors 26 can then be externally connected to the electrical supply voltage.

Figure 6:
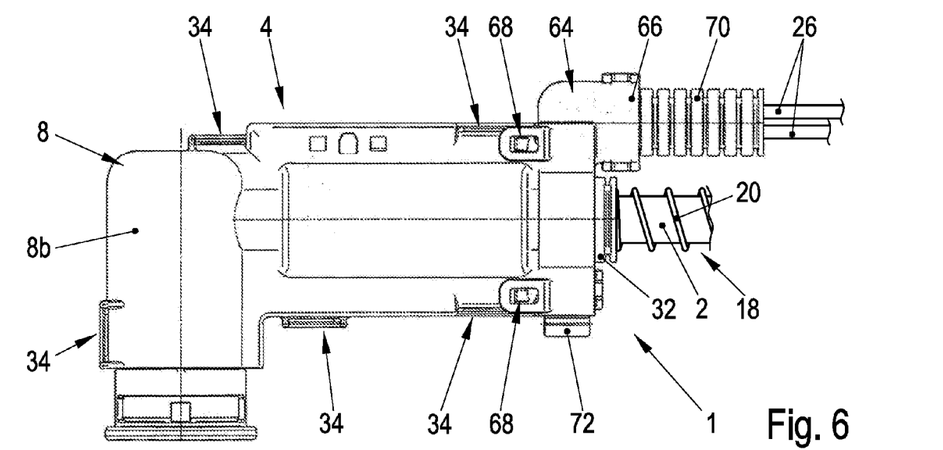
FIG. 6 is a side view similar to FIG. 1 with an additional branch section for the connecting conductors connected to the housing.
Figure 7:
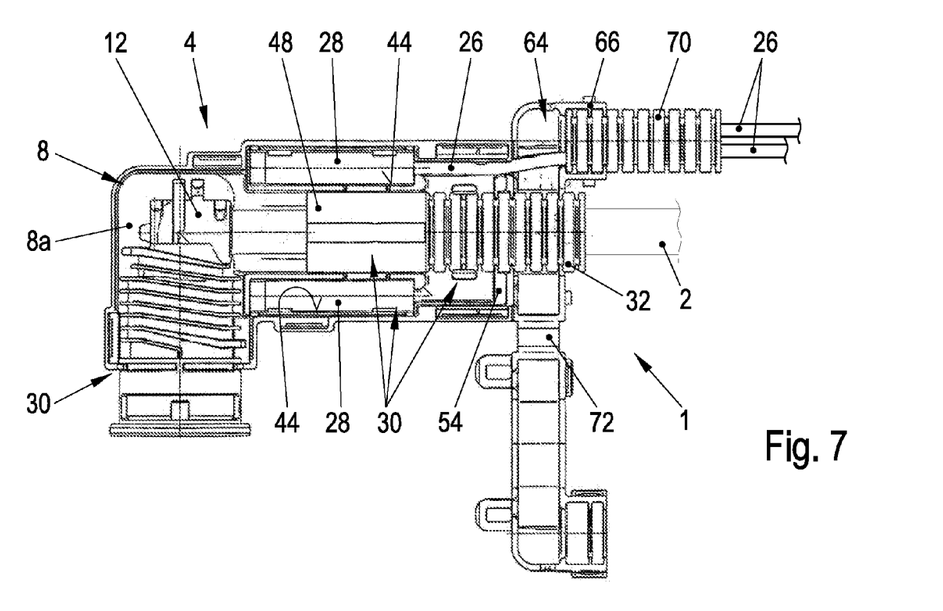
FIG. 7 is a side view, similar to FIG. 3, with the additional branch section according to FIG. 6 in the open state.

In the embodiment according to FIGS. 6 and 7, a separate branch section 64, which is connected, or which can be connected, to the housing 8, with a branch 66 is provided for the connecting conductor(s) 26. In this regard, reference is further made to utility model application DE 20 2008 004 954.7. The branch section 64 is in particular connected to the housing 8 via snap-on elements 68. The branch section 64 is configured in the area of the branch 66 for fixingly accommodating an end section of a conductor sheath 70—in particular formed by a corrugated tube—for the connecting conductor(s). According to FIG. 7, the branch section 64 consists of the housing halves which are preferably connected one-piece to one another via an integral hinge 72 in such a manner that they are simply folded up and snapped on to one another for closing. The branch section 64 then preferentially also encloses the sheath 32 of the fluid line 2. The conductor sheath 70 can basically be fixed in the branch 66 similarly to the fixing of the sheath 32 in the accommodating compartment 54 of the housing 8.

Figure 11:
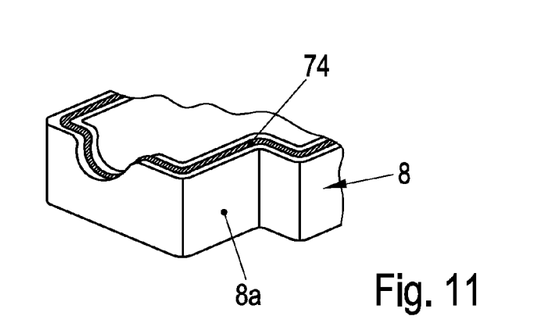
FIG. 11 is a perspective view of a special embodiment of the partial cross-section of a housing part.

It should still be mentioned at this point that both housing parts 8a and 8b of the housing 8 can also be sealed against one another via a peripheral seal 74, as is shown by way of example in FIG. 11. The same applies, if necessary, to the branch section 64 as well.

The sheath 32 of the fluid line 2 is sealed in its end section inside the housing 8 via sealants, in particular made of butyl rubber, relative to the fluid line 2 or, as the case may be, to the fluid connector 6. Alternatively, a molded sealing ring can be provided for example as a molded part of a suitable material, such as HNBR (hydrogenated nitrile butadiene rubber). In this case, the heating wires merely have to be threaded through the openings. Another alternative consists of providing a seal by means of PU (polyurethane) foam or the like.

Finally, the sheath 32 can also be sealed against the fluid connector 6 by means of a heat shrinkable tube.

So-called double-crimp connectors can also be used as conductor connectors 28, each conductor being crimped individually in a crimp section, the crimp sections being connected via a connecting section. For example, it can be a somewhat H-shaped sheet metal cut to size, where a conductor can respectively be crimped in the region of the vertical H-bars. The transverse bar of the H-shape forms the connecting section.

In another advantageous embodiment, an electronic plug connector can be integrated in the housing 8 or in the branch section 64 (not shown in the drawing) for connecting the connecting conductors 26.

It is also advantageous if all available heating conductors and, in particular, also the connecting conductors are configured with the same outer diameter. In this case, the cross-sections of the available heating wires can still vary in so far as the wall thickness of the insulation of the conductors correspondingly varies.

In the area of the fluid connector 6, and in particular in that of the second connecting section 14, the housing 8 conveniently also has fixing means, in particular in the form of bars protruding inward which mesh with slot-like recesses (indentations) of the fluid connector 6. In this regard, reference is made for example to FIGS. 2 to 4.

The branch section 64 can be executed in any way relative to the outlet direction of the branch 66. According to FIGS. 6 and 7, the outlet direction of the branch 66 is parallel to the fluid line 2. Consequently, the conductor sheath 70 extends parallel to the fluid line 2 and its sheath 32. Alternatively, the branch section 64 can also be configured in such a manner that the conductor sheath 70 extends at any other angle relative to the line axis of the fluid line 2, for example 90° or 45°.

It should additionally also be mentioned that an overlength of the heating wire 20 of the fluid line can be used as a heating wire for winding the fluid connector 6. In this way, a conductor connector (in particular a crimp connector) can be eliminated.

Figure 16:
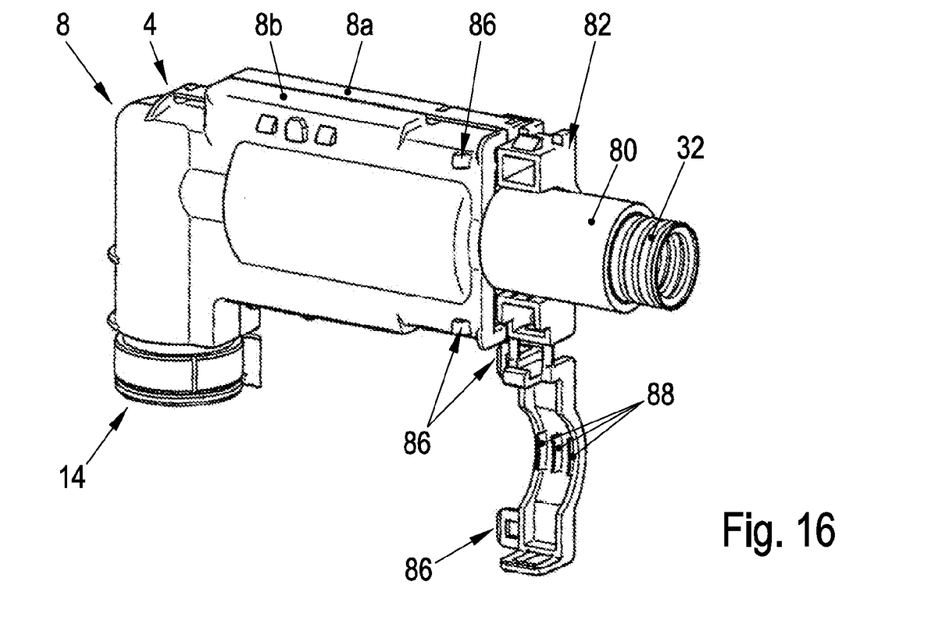
FIG. 16 is a view similar to FIG. 1 in another embodiment of the media line according to the present invention.
Figure 17:
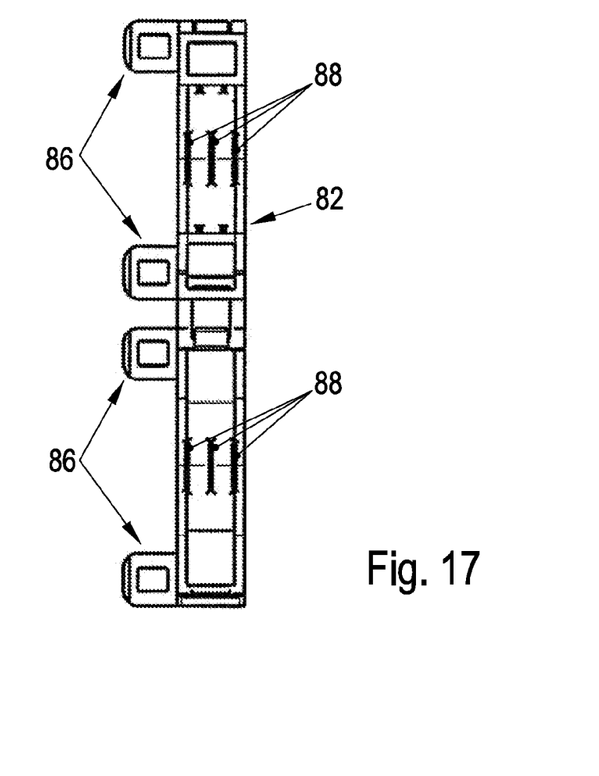
FIG. 17 is a separate, enlarged view of a component from FIG. 16.

In the embodiment shown in FIGS. 16 and 17, the fluid line 2 is enclosed by an additional thermal protection sheath 80, namely preferentially also including the sheath 32. FIG. 16 merely shows a short end section of the thermal protection sheath 80; it can, however extend over the entire length or at least over a partial length of the fluid line 2. In this case, the thermal protection sheath 80 is at least fixed with one end section to, or in the housing of, the line connector 4. In the shown embodiment according to FIG. 16, the thermal protection sheath 80 is located with its end face outside, in front of the housing 8, but can also be led into the housing 8. A retainer clamp 82 is conveniently provided for fixing that, according to FIGS. 16 and 17, consists of two halves preferentially connected via an integral hinge 84, which can thus be folded up and snapped on to one another in such a manner that the retainer clamp 82 encloses the thermal protection sheath 80 in a ring-shaped manner and accommodates it in a force-fit, or, as the case may be, in a form-fit. As the retainer clamp 82 is connected, or can be connected, to the housing 8, in particular via snap-on elements 86, the thermal protective sheath 80 is fixed relative to the housing 8. The snap-on elements 86 are preferably configured similarly to the snap-on elements 68 of the branch section 64. 82 Rib-like or tooth-like elements 88 can be arranged inside the retainer clamp for a good at least force-fitting or, as the case may be, form-fitting support of the thermal protection sheath 80. The thermal protection sheath 80 can have a corresponding groove-like profile (not shown) into which the elements 88 can radially engage.

The thermal protection sheath 80 basically consists of a metal foil, preferably an aluminum foil, preferably having an inner reinforcement consisting in particular of a laminated glass fabric. The metal foil can also consist of (possibly high-alloy) stainless steel as well as of several layers, e.g. a first (inner) aluminum layer and a second (outer) stainless steel layer.

Figure 18:
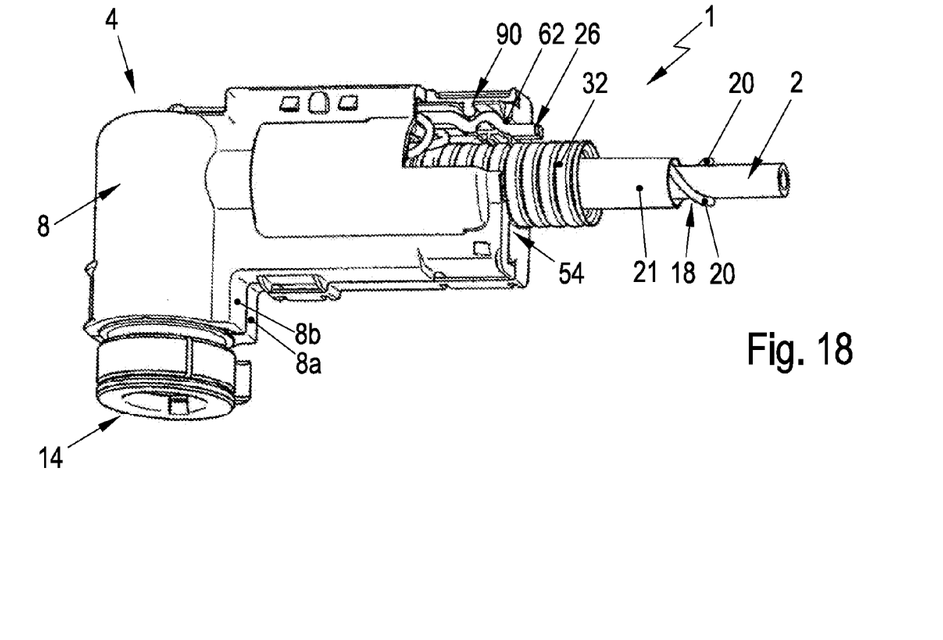
FIG. 18 is an illustration similar to FIG. 1 of another embodiment and with part of the housing cut-away.
Figure 19:
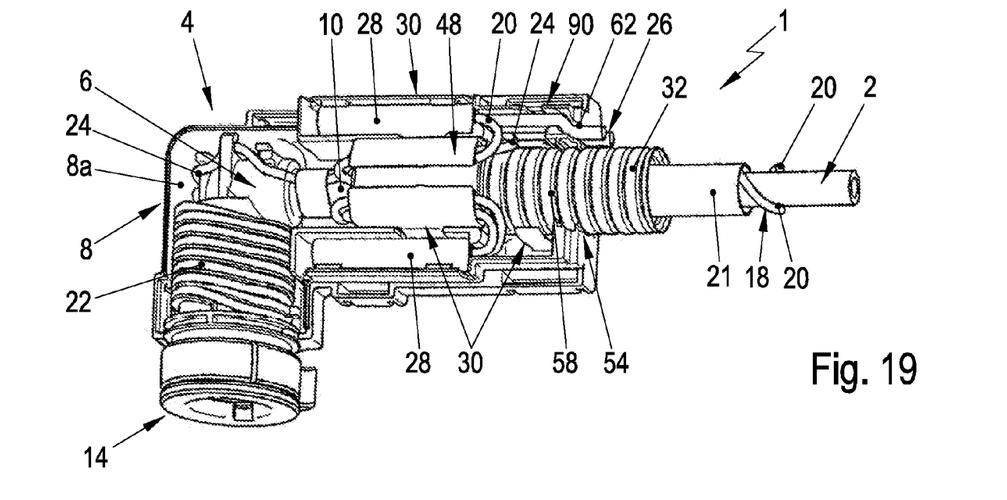
FIG. 19 is a view similar to FIG. 2, but of the embodiment variant seen in FIG. 18.

In the embodiment variants shown in FIGS. 18 and 19, special elements for fixing the connecting conductor(s) 26 in a strain-relief manner are formed inside the housing 8, namely in particular in the form of a deflection clamp 90 via which the connecting conductor(s) 26 can be at least singly (FIG. 19) or preferably repeatedly (FIG. 18) deflected in a clamping manner.

The through-opening 62 for the connecting conductor(s) 26 can be provided with an additional closing element that is not visible in the drawings, which encloses the connecting conductors 26 in a flexible sealing manner. For an execution without connecting conductors 26, a closing element, which is not shown, e.g. in the form of a dummy plug, can advantageously be inserted into the through-opening in order to tightly close the housing 8 at this point.

The invention is not limited to the illustrated and described exemplary embodiment but also comprises all equally acting embodiments along the lines of the invention.

We claim:

1. An electrically heatable media line comprising a fluid line and at least one line connector, a fluid connector connected to an end of the fluid line and an outer housing, the fluid line and the line connector each including electrical heating means, wherein the fluid connector is enclosed at least in a region including the heating means and together with an end section of the fluid line in a capsule-like manner by the housing, the housing having fixing means for accommodating, in a mechanically fixing manner, the fluid connector with the connected line end and for accommodating electrical conductors and conductor connectors of the heating means.

2. The media line according to claim 1, wherein the fluid line and the heating means associated therewith are enclosed by a sheath, the fixing means of the housing also accommodating an end section of the sheath in a fixing manner.

3. The media line according to claim 1, wherein the housing includes at least two half shell housing parts, such that, in an open state, all components can be inserted into one of the housing parts and fixed therein, and wherein the housing parts are preferentially connected non-detachably in a closed state.

4. The media line according to claim 3, wherein the housing parts are connected via form-fitting snap-on connections.

5. The media line according to claim 1, wherein the housing has at least one accommodating compartment, arranged parallel next to the conductor connectors as fixing means for the conductor connectors.

6. The media line according to claim 1, wherein the electrical connectors are each formed by a connector element, each connector element being inserted in one of a force-fit or form-fit into the accommodating compartment of the housing for fixing and as a strain relief for the conductors.

7. The media line according to claim 6, the connector elements are each configured as one of crimp connectors, solder connectors and welded connectors.

8. The media line according to claim 1, wherein a separate fixing part is inserted into the housing as a fixing means for the electrical conductors running inside the housing, the fixing part being superimposed laterally on the sheath of the fluid line as a clip, and having formed thereon an accommodating compartment with a C-shaped cross-section configured to receive the conductors therein.

9. The media line according to claim 1, wherein the housing further has an accommodating section as a fixing means for the sheath of the fluid line that is configured such that the sheath is fixed against movements in the longitudinal direction as well as against rotation around its longitudinal axis.

10. The media line according to claim 9, wherein the accommodating section fixingly accommodates the sheath has an engaging contour with inner peripheral ribs which engage radially in peripheral grooves of the sheath, the peripheral ribs having tooth-like projections which act as one of a force-fit or as a form-fit against the sheath.

11. The media line according to claim 1, wherein the heating means of the fluid line is formed by at least one helical, heating conductor extending over the perimeter thereof.

12. The media line according to claim 1, wherein the heating means of the fluid connector is formed by at least one heating conductor extending over the outer surface thereof.

13. The media line according to claim 1, wherein at least one electrical connecting conductor is led into the housing from the outside and is connected in a conductive manner to the heating means via one of the conductor connectors.

14. The media line according to claim 13, wherein the housing has at least one through-opening for the connecting conductor.

15. The media line according to claim 13, further comprising a separate branch section which is connected to the housing, and with one branch for the connecting conductor.

16. The media line according to claim 15, wherein the branch section is configured for fixingly accommodating an end section of a conductor sheath for the connecting conductor.

17. The media line according to claim 2, wherein the sheath of the fluid line is sealed at its end section inside the housing via sealants relative to at least one of the fluid line the fluid connector.

18. The media line according to claim 3, wherein the housing parts of the housing are sealed against one another via a peripheral seal.

19. The media line according to claim 1, wherein the fluid line is enclosed over at least part of its length by a thermal protection sheath.

20. The media line according to claim 19, wherein the thermal protection sheath is fixed at least with one end section to the housing of the line connector, a retainer clamp engaging the thermal protection sheath, and connected to the housing via snap-on elements.

21. The media line according to claim 19, wherein the thermal protection sheath is formed of a fabric reinforced metal foil.

22. The media line according to claim 13, wherein a deflection clamp is formed with the housing for fixing the connection conductor in a strain relieving manner.

23. The media line according to claim 14, wherein a closing element for closing and sealing each through-opening.

24. A line connector for media lines, comprising a fluid connector having at least one connecting section configured to connect to a fluid line, a transition section adjacent to the connecting section and an inner fluid channel, as well as having electrical heating means, a housing enclosing the fluid connector at least in the region of the heating means, the housing having fixing means for accommodating, in a mechanically fixing manner, the fluid connector as well as electrical conductor connectors and electrical conductors of the heating means.

* * * * *